United States Patent
Hata et al.

(10) Patent No.: US 9,698,443 B2
(45) Date of Patent: Jul. 4, 2017

(54) ELECTROLYTE SHEET FOR SOLID OXIDE FUEL CELL, METHOD FOR PRODUCING THE SAME, AND SINGLE CELL FOR SOLID OXIDE FUEL CELL INCLUDING THE SAME

(71) Applicant: NIPPON SHOKUBAI CO., LTD., Osaka-shi, Osaka (JP)

(72) Inventors: Kazuo Hata, Osaka (JP); Katsuhiko Sakamoto, Himeji (JP); Norikazu Aikawa, Himeji (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 84 days.

(21) Appl. No.: 14/431,246

(22) PCT Filed: Sep. 27, 2013

(86) PCT No.: PCT/JP2013/005776
§ 371 (c)(1),
(2) Date: Mar. 25, 2015

(87) PCT Pub. No.: WO2014/050142
PCT Pub. Date: Apr. 3, 2014

(65) Prior Publication Data
US 2015/0270569 A1    Sep. 24, 2015

(30) Foreign Application Priority Data
Sep. 28, 2012   (JP) .................................. 2012-216695

(51) Int. Cl.
*H01M 8/1246* (2016.01)
*C04B 35/622* (2006.01)
(Continued)

(52) U.S. Cl.
CPC ..... *H01M 8/1246* (2013.01); *C04B 35/62218* (2013.01); *H01M 8/10* (2013.01);
(Continued)

(58) Field of Classification Search
CPC .... H01M 8/1246; H01M 8/10; H01M 8/1004; C04B 35/62218
See application file for complete search history.

(56) References Cited

U.S. PATENT DOCUMENTS 6,001,761 A   12/1999   Hata et al.
6,902,790 B1   6/2005   Hata et al.
(Continued)

FOREIGN PATENT DOCUMENTS

EP   1063212   12/2000
EP   1916228   4/2008
(Continued)

*Primary Examiner* — Helen O Conley
(74) *Attorney, Agent, or Firm* — Abel Law Group, LLP

(57) ABSTRACT

In at least one of principal surfaces of the electrolyte sheet for a solid oxide fuel cell of the present invention, (1) a burr height [ΔH (0-3)] in a first zone is 100 μm or less, as measured by irradiating the principal surface of the sheet with a laser beam at a pitch of 0.01 mm using a laser optical three-dimensional shape measurement device, the first zone being a zone extending between a peripheral edge of the sheet and a position 3 mm inside the peripheral edge, and (2) a ratio [ΔH (0.61-3)/ΔH (0-0.6)] of a burr height [ΔH (0.61-3)] in a third zone to a burr height [ΔH (0-0.6)] in a second zone is 0.5 or more and 2.0 or less, as calculated from the burr heights measured by irradiating the principal surface of the sheet with a laser beam at a pitch of 0.01 mm using the laser optical three-dimensional shape measurement device, the second zone being a zone extending between the peripheral edge of the sheet and a position 0.6 mm inside the peripheral edge, and the third zone being a zone extending between a position 0.61 mm inside the peripheral edge of the sheet and the position 3 mm inside the peripheral edge.

4 Claims, 5 Drawing Sheets

(51) Int. Cl.
*H01M 8/10* (2016.01)
*H01M 8/1004* (2016.01)
*H01M 8/124* (2016.01)

(52) U.S. Cl.
CPC ..... *H01M 8/1004* (2013.01); *C04B 2235/963* (2013.01); *H01M 2008/1293* (2013.01); *H01M 2300/0071* (2013.01); *H01M 2300/0074* (2013.01); *Y02E 60/525* (2013.01); *Y02P 70/56* (2015.11)

(56) References Cited

U.S. PATENT DOCUMENTS

| | | |
|---|---|---|
| 7,781,045 B2 | 8/2010 | Hata et al. |
| 2004/0175604 A1 | 9/2004 | Ito et al. |
| 2005/0271919 A1 | 12/2005 | Hata et al. |
| 2008/0246194 A1 | 10/2008 | Ito et al. |
| 2009/0047562 A1 | 2/2009 | Hata et al. |

FOREIGN PATENT DOCUMENTS

| | | |
|---|---|---|
| JP | 200110866 A | 1/2001 |
| JP | 200649248 A | 2/2006 |
| JP | 2010517208 A | 5/2010 |
| JP | 4653135 B2 | 12/2010 |
| JP | 201153190 A | 3/2011 |
| JP | 2012204149 A | 10/2012 |
| JP | 2012209013 A | 10/2012 |
| WO | 03027041 A1 | 4/2003 |
| WO | 2004034492 A1 | 4/2004 |
| WO | 2007013567 A1 | 2/2007 |
| WO | 2008054774 A2 | 5/2008 |

ELECTROLYTE SHEET FOR SOLID OXIDE FUEL CELL, METHOD FOR PRODUCING THE SAME, AND SINGLE CELL FOR SOLID OXIDE FUEL CELL INCLUDING THE SAME

TECHNICAL FIELD

The present invention relates to an electrolyte sheet for a solid oxide fuel cell, a method for producing the electrolyte sheet, and a single cell for a solid oxide fuel cell including the electrolyte sheet.

BACKGROUND ART

Fuel cells have recently attracted attention as clean energy sources. Among these fuel cells, solid oxide fuel cells (hereinafter referred to as "SOFCs") using solid ceramic materials as electrolytes are expected to be used in a wide variety of applications ranging from domestic power supplies to large-scale power generation, due to their advantages such as high operating temperatures allowing utilization of waste heat and high efficiency power generation.

As a SOFC, a stack of single cells each including an electrolyte sheet and electrodes provided on the electrolyte sheet is used. The long-term stability of the power generation performance of the SOFC requires sophisticated quality control of each electrolyte sheet.

One of the important parameters for the quality control of electrolyte sheets is a so-called "burr", which is, for example, a change in the height of the surface of the peripheral portion of a sheet. If burrs are present on the peripheral portion of a sheet, they may cause defects such as cracking in the sheet during printing of an electrode or even poor printing of the electrode, resulting in uneven formation of the electrode or susceptibility to delamination thereof. Furthermore, a SOFC is composed of a stack of series-connected single cells each including an electrolyte sheet and electrodes. Therefore, during the stacking of the single cells or the power generation of the SOFC, stresses are concentrated on the burrs on the peripheral portion of the electrolyte sheet, which may cause fracture of the electrolyte sheet.

Thus, various techniques focusing on burrs on the peripheral portion of an electrolyte sheet for a SOFC have been developed. For example, Patent Literature 1 proposes, for use as an electrolyte sheet a SOFC, a ceramic sheet having a reduced burr height of 100 μm or less on its peripheral portion.

CITATION LIST

Patent Literature

Patent Literature 1: JP 4653135 B2

SUMMARY OF INVENTION

Technical Problem

However, when an anode and a cathode are applied by screen printing onto the surfaces of an electrolyte sheet having a burr height of 100 μm or less on its peripheral portion, cracking may occur in the electrolyte sheet under certain printing conditions (for example, the printing speed is increased to increase the productivity), even if the electrolyte sheet has passed a load test. Cracking may also occur in the electrolyte sheets during the stacking of the SOFC single cells thus prepared. If the resulting stack is installed in an actual fuel cell power generator to generate power, the power generation performance of the power generator may degrade rapidly in the early stage of its operation.

Accordingly, it is an object of the present invention to provide an electrolyte sheet for a SOFC with reduced susceptibility to defects such as cracking during production of SOFC single cells and stacking of the SOFC single cells, and a method for producing this electrolyte sheet. It is another object of the present invention to provide a SOFC single cell including this electrolyte sheet for a SOFC.

Solution to Problem

The present invention provides an electrolyte sheet for a SOFC. The sheet has a thickness of 50 to 300 μm. In at least one of principal surfaces of the sheet, (1) a burr height [ΔH (0-3)] in a first zone is 100 μm or less, as measured by irradiating the principal surface of the sheet with a laser beam at a pitch of 0.01 mm and three-dimensionally analyzing light reflected from the principal surface using a laser optical three-dimensional shape measurement device, the first zone being a zone extending between a peripheral edge of the sheet and a position 3 mm inside the peripheral edge, and (2) a ratio [ΔH (0.61-3)/ΔH (0-0.6)] of a burr height [ΔH (0.61-3)] in a third zone to a burr height [ΔH (0-0.6)] in a second zone is 0.5 or more and 2.0 or less, as calculated from the burr heights measured by irradiating the principal surface of the sheet with a laser beam at a pitch of 0.01 mm and three-dimensionally analyzing light reflected from the principal surface using the laser optical three-dimensional shape measurement device, the second zone being a zone extending between the peripheral edge of the sheet and a position 0.6 mm inside the peripheral edge, and the third zone being a zone extending between a position 0.61 mm inside the peripheral edge of the sheet and the position 3 mm inside the peripheral edge.

The present invention also provides a method for producing an electrolyte sheet for a SOFC. This method includes:

a green sheet producing step of preparing a slurry containing a ceramic material powder, a binder, and a dispersion medium, forming the slurry into a sheet and drying the sheet to obtain a green body, and cutting the green body into a predetermined shape to obtain a green sheet for an electrolyte sheet for a SOFC;

a pressing step of sandwiching the green sheet between plates whose surfaces facing surfaces of the green sheet each have an arithmetical mean roughness value (Ra) of 0.001 to 0.1 μm and a dry peel force of 10 to 1000 mN/cm and applying a pressure to the green sheet; and a sintering step of sintering the green sheet that has undergone the pressing step.

The present invention further provides a SOFC single cell. The single cell includes: an anode; a cathode; and the electrolyte sheet for a SOFC of the present invention, disposed between the anode and the cathode.

Advantageous Effects of Invention

According to the present invention, it is possible to provide an electrolyte sheet for a SOFC which is less susceptible to defects such as cracking on its peripheral portion during production of SOFC single cells and stacking of the SOFC single cells. In addition, according to the SOFC single cell of the present invention including this electrolyte sheet for a SOFC, it is possible to obtain a highly reliable SOFC which is less susceptible to degradation of its power generation performance.

DESCRIPTION OF EMBODIMENTS

First Embodiment

Figure 1:
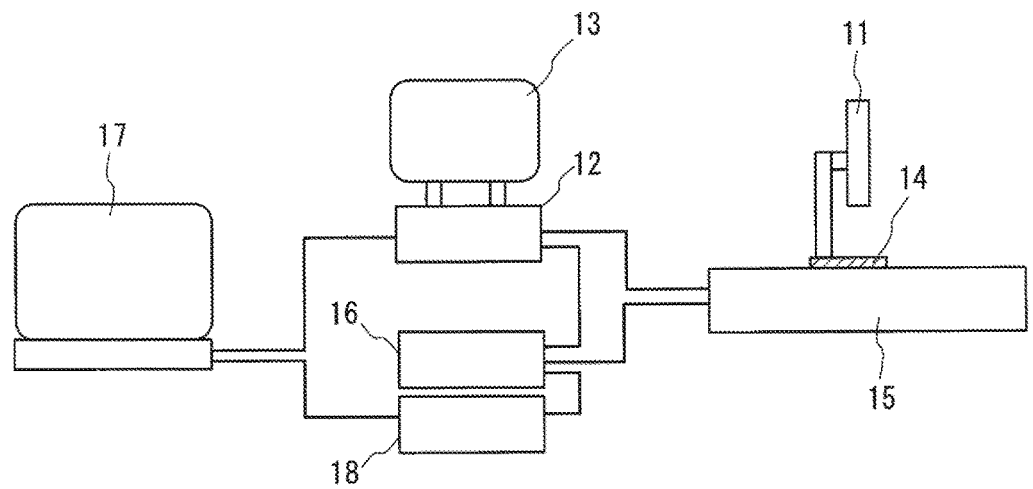
FIG. 1 is a block diagram showing a specific example of a laser optical three-dimensional shape measurement device used to measure a burr height.

Embodiments of the electrolyte sheet for a SOFC of the present invention will be described specifically.

The electrolyte sheet for a SOFC of the present embodiment has the following characteristics (1) and (2), in at least one of principal surfaces of the sheet:

(1) a burr height [ΔH (0-3)] in a first zone is 100 μm or less, as measured by irradiating the principal surface of the sheet with a laser beam at a pitch of 0.01 mm and three-dimensionally analyzing light reflected from the principal surface using a laser optical three-dimensional shape measurement device, the first zone being a zone extending between a peripheral edge of the sheet and a position 3 mm inside the peripheral edge; and (2) a ratio [ΔH (0.61-3)/ΔH (0-0.6)] of a burr height [ΔH (0.61-3)] in a third zone to a burr height [ΔH (0-0.6)] in a second zone is 0.5 or more and 2.0 or less, as calculated from the burr heights measured by irradiating the principal surface of the sheet with a laser beam at a pitch of 0.01 mm and three-dimensionally analyzing light reflected from the principal surface using the laser optical three-dimensional shape measurement device, the second zone being a zone extending between the peripheral edge of the sheet and a position 0.6 mm inside the peripheral edge, and the third zone being a zone extending between a position 0.61 mm inside the peripheral edge of the sheet and the position 3 mm inside the peripheral edge.

Here, the peripheral edge of the sheet is defined as follows. When a laser beam is applied from outside the sheet toward the center of the sheet over its peripheral portion to sample data at a pitch of 0.01 mm, a point within a scan range of 0.05 mm, at which a displacement obtained from a displacement curve of the surface of the sheet is 80% of the actual thickness of the sheet, is defined as a 0 (zero) point, that is, the peripheral edge of the sheet. The reason why the peripheral edge is defined as the point at which the displacement observed is 80% of the actual sheet thickness is as follows. In the electrolyte sheet of the present invention having a thickness of 50 to 300 μm, the in-plane direction of the peripheral edge surface (peripheral side surface) of the electrolyte sheet is not always vertical but may be inclined from the vertical direction due to warpage or waviness of the electrolyte sheet. This inclination tends to increase in particular when the electrolyte sheet is a thin film having a thickness of about 50 to 150 μm, and it may be difficult to uniquely define the peripheral edge. Therefore, in the present invention, on the basis of the sheet thickness, the 0 (zero) point is defined as a point at which the displacement observed is 80% of the actual sheet thickness.

The thickness of the electrolyte sheet as used herein is the average of the values obtained by measuring the thicknesses at arbitrarily selected 4 points in a region 5 mm or more inside the peripheral edge of the sheet (i.e., the central region of the sheet) using a U-shaped micrometer (manufactured by Mitutoyo Corporation).

As used in the present invention, in the case of an electrolyte sheet having no holes therein, a burr height is defined as the difference between the maximum displacement point and the minimum displacement point located inside the position of the maximum displacement point in each of predetermined zones delimited from the outer peripheral edge of the sheet toward the center thereof (for example, in a first zone ranging from the outer peripheral edge of the sheet to a position 3 mm inside the outer peripheral edge).

In the case of an electrolyte sheet having a hole therein, burrs are formed near the outer peripheral edge of the sheet and the inner peripheral edge thereof (the peripheral edge of the hole). Therefore, in this case, a burr height is defined not only as the difference between the maximum displacement point and the minimum displacement point located inside the position of the maximum displacement point in each of the predetermined zones delimited from the outer peripheral edge of the sheet toward the center thereof but also the difference between the maximum displacement point and the minimum displacement point located outside the position of the maximum displacement point in each of predetermined zones delimited from the inner peripheral edge of the sheet toward the outer peripheral edge thereof.

The characteristic (1) described above is that the burr height [ΔH (0-3)] in the first zone ranging from the peripheral edge of the sheet to the position 3 mm inside the peripheral edge is 100 μm or less. Here, the burr height [ΔH (0-3)] in the first zone is the difference in height between the maximum displacement point and the minimum displacement point in the first zone of the surface of the sheet. Hereinafter, the burr height in each of the other delimited zones is also the difference in height between the maximum displacement point and the minimum displacement point in that zone of the surface of the sheet. Hereinafter, the burr height [ΔH (0-3)] in the first zone is also referred to as the "burr height in the peripheral portion of the sheet". The burr height [ΔH (0-3)] in the first zone is desirably 90 μm or less, more desirably 80 μm or less, even more desirably 70 μm or less, and particularly desirably 60 μm or less.

For the characteristic (2) described above, the first zone is divided into a second zone (a zone extending between the peripheral edge of the sheet and a position 0.6 mm inside the peripheral edge) and a third zone (a zone extending between a position 0.61 mm inside the peripheral edge of the sheet and the position 3 mm inside the peripheral edge), and the burr heights in these zones, that is, the burr height [ΔH (0-0.6)] in the second zone and the bur height [ΔH (0.61-3)] in the third zone are measured. The characteristic (2) mentioned above is that the ratio [ΔH (0.61-3)/ΔH (0-0.6)] of the burr height [ΔH (0.61-3)] in the third zone to the burr height [ΔH (0-0.6)] in the second zone is 0.5 or more and 2.0 or less.

The present inventors studied the structural features of an electrolyte sheet which is susceptible to defects such as cracking in its peripheral portion during production of SOFC single cells and stacking of the SOFC single cells. As a result, they found that the maximum displacement point and the minimum displacement point that determine the burr height [ΔH (0-3)] in the first zone of the surface of the sheet are often present in a zone extending between the peripheral edge of the sheet and the position 0.6 mm inside the peripheral edge. This is also confirmed in Examples below. The present inventors found that an electrolyte sheet having a significantly warped-up portion near the peripheral edge is more susceptible to defects such as cracking in the peripheral portion thereof during production of SOFC single cells and stacking of the SOFC single cells. So, they divided the first zone, at the position 0.6 mm inside the peripheral edge of the sheet, into a zone (second zone) located outside the 0.6-mm position on the peripheral edge side of the sheet and a zone (third zone) inside the 0.6-mm position, and limited the ratio of the burr height in the third zone to the burr height in the second zone within a range of 0.5 or more and 2.0 or less. As a result, they identified an electrolyte sheet whose peripheral portion (ranging from the peripheral edge to the position 3 mm inside the peripheral edge) is less warped up near the peripheral edge and has a burr with a relatively gentle slope. This electrolyte sheet is less susceptible to defects such as cracking in the peripheral portion thereof during production of SOFC single cells and stacking of the SOFC single cells.

As described above, in the electrolyte sheet of the present embodiment, it is only necessary that the ratio [ΔH (0.61-3)/ΔH (0-0.6)] be in a range of 0.5 or more and 2.0 or less. The ratio [ΔH (0.61-3)/ΔH (0-0.6)] is desirably 0.55 or more, and more desirably 0.6 or more. The ratio [ΔH (0.61-3)/ΔH (0-0.6)] is desirably 1.8 or less, more desirably 1.5 or less, even more desirably 1.3 or less, and particularly desirably 1.0 or less.

It is possible to reliably prevent occurrence of defects such as cracking in the peripheral portion of the electrolyte sheet during production of SOFC single cells and stacking of the SOFC single cells by minimizing the degree of warping-up of the sheet in a region closer to the peripheral edge thereof. Therefore, it is desirable that the ratio [ΔH (0.31-3)/ΔH (0-0.3)] of the burr height [ΔH (0.31-3)] in a fifth zone to the burr height [ΔH (0-0.3)] in a fourth zone be 0.5 or more and 2.0 or less, as calculated from the burr heights measured by irradiating the surface of the sheet with a laser beam at a pitch of 0.01 mm and three-dimensionally analyzing light reflected from the surface using a laser optical three-dimensional shape measurement device. Here, the fourth zone is a zone extending between the peripheral edge of the sheet and a position 0.3 mm inside the peripheral edge, and the fifth zone is a zone extending between a position 0.31 mm inside the peripheral edge of the sheet and the position 3 mm inside the peripheral edge. The ratio [ΔH (0.31-3)/ΔH (0-0.3)] is desirably 0.55 or more, and more desirably 0.6 or more. The ratio [ΔH (0.31-3)/ΔH (0-0.3)] is desirably 1.8 or less, more desirably 1.5 or less, even more desirably 1.3 or less, and particularly desirably 1.0 or less.

It is possible to more reliably prevent occurrence of defects such as cracking in the peripheral portion of the electrolyte sheet during production of SOFC single cells and stacking of the SOFC single cells by minimizing the degree of warping-up of the sheet in a region more closer to the peripheral edge thereof. Therefore, it is desirable that the ratio [ΔH (0.11-3)/ΔH (0-0.1)] of the burr height [ΔH (0.11-3)] in a seventh zone to the burr height [ΔH (0-0.1)] in a sixth zone be 0.5 or more and 2.0 or less, as calculated from the burr heights measured by irradiating the surface of the sheet with a laser beam at a pitch of 0.01 mm and three-dimensionally analyzing light reflected from the surface using a laser optical three-dimensional shape measurement device. Here, the sixth zone is a zone extending between the peripheral edge of the sheet and a position 0.1 mm inside the peripheral edge, and the seventh zone is a zone extending between a position 0.11 mm inside the peripheral edge of the sheet and the position 3 mm inside the peripheral edge. The ratio [ΔH (0.11-3)/ΔH (0-0.1)] is desirably 0.55 or more, and more desirably 0.6 or more. The ratio [ΔH (0.11-3)/ΔH (0-0.1)] is desirably 1.8 or less, more desirably 1.5 or less, even more desirably 1.3 or less, and particularly desirably 1.0 or less.

As described above, the burr height can be measured by irradiating the surface of the sheet with a laser beam and three-dimensionally analyzing light reflected from the surface using a laser optical three-dimensional shape measurement device. The laser optical three-dimensional shape measurement device is a non-contact three-dimensional micro-profile analyzing device having the following structure: The surface of an electrolyte sheet to be analyzed is irradiated with a laser beam to focus the beam on the surface and light reflected from the surface is uniformly imaged onto a photodiode. When unevenness occurs in the image due to displacements on the surface of the sheet, a signal for compensating the unevenness is immediately output so as to control an objective lens to constantly focus on the surface of the sheet. The moving amount of the lens is detected and thereby the irregularities on the surface of the sheet to be analyzed can be detected in a non-contact manner. Such a device with a resolution of 1 μm or less, desirably 0.1 μm or less is usually used, but in the present embodiment, a device with a resolution of 0.01 μm is used to accurately detect the burr height in each zone.

The laser optical three-dimensional shape measurement device is described in more detail with reference to a specific example shown in FIG. 1. A laser-based measuring instrument 11 is provided with a red semiconductor laser light source with a wavelength of 670 nm and a spot diameter of about 2 μm. The device has a resolution of 0.01 μm, and the scanning pitch can be preset at 6 levels from 0 to 1100 μm. Preferably, the laser-based measuring instrument 11 also has a microscopic mechanism equipped with an infrared LED light source with a wavelength of 870 nm. A preferred example of the measuring instrument 11 is a high-accuracy double scanning laser sensor, LT series (manufactured by Keyence Corporation). In a laser-based measuring instrument controller 12, the minimum displayable unit is 0.01 μm, the display cycle is 10 times/second, and the control I/O is a no-voltage input and NPN open collector output type. The laser-based measuring instrument controller 12 is connected to a monitor 13 by a PIN connector.

An automatic XY stage 15 on which a test sample 14 is to be placed is controlled by a dual-drive position controller 16 driven at a rate of 1 pps to 500 Kpps. Positioning, data acquisition from the laser-based measuring instrument 11, and filing of the data are achieved by an Excel-based position measurement software application running on a personal computer for data processing 17. Acquisition of DC analog voltages from the laser-based measuring instrument controller 12 synchronized with the movement of the automatic stage 15 is achieved by an analog controller 18. A preferred example of this system is a high-speed three-dimensional shape measurement system "EMS2002AD-3D" manufactured by COMS Co., Ltd.).

Since the electrolyte sheet of the present embodiment is used in a SOFC single cell, it has a thickness of 50 to 300 µm. The thickness is desirably 80 to 250 µm, and more desirably 100 to 200 µm.

The size of the electrolyte sheet of the present embodiment is not particularly limited, and a sheet having a plane area of, for example, 50 $cm^2$ or more and 900 $cm^2$ or less, preferably 80 $cm^2$ or more and 500 $cm^2$ or less, is used preferably.

In the case of the electrolyte sheet as described above, it may have any shape such as circular, elliptical, or rectangular with rounded corners. The sheet may have one or more holes having the shape such as circular, elliptical, or rectangular with rounded corners. In the case where the sheet has a hole, the above-mentioned plane area means the area of the surface of the sheet including the area of the hole (i.e., the area defined by the outline of the sheet). The peripheral edge of the sheet and the peripheral portion thereof usually refer to the outer peripheral edge of the electrolyte sheet and the outer peripheral portion thereof respectively. However, in the case of the electrolyte sheet having a hole formed therein, the peripheral edge and the peripheral portion of the sheet also include the peripheral edge and the peripheral portion of the hole.

Next, an example of the method for producing the electrolyte sheet of the present embodiment is described.

An example of the method for producing the electrolyte sheet of the present embodiment includes:

a green sheet producing step of preparing a slurry containing a ceramic material powder, a binder, and a dispersion medium, forming the slurry into a sheet and drying the sheet to obtain a green body, and cutting the green body into a predetermined shape to obtain a green sheet for an electrolyte sheet for a SOFC;

a pressing step of sandwiching the green sheet between plates whose surfaces facing surfaces of the green sheet each have an arithmetical mean roughness value (Ra) of 0.001 to 0.1 µm and a dry peel force of 10 to 1000 mN/cm and applying a pressure to the green sheet; and a sintering step of sintering the green sheet that has undergone the pressing step.

(Green Sheet Producing Step)

First, a ceramic material powder as an electrolyte component of the electrolyte sheet is prepared. The electrolyte component can be selected from known materials used as electrolyte components of electrolyte sheets for SOFCs. For example, zirconia stabilized with yttria, ceria, scandia, or ytterbia; ceria doped with yttria, samaria, or gadolinia; a lanthanum gallate or a lanthanum gallate-based perovskite oxide in which lanthanum or gallium is partially substituted by strontium, calcium, barium, magnesium, aluminum, indium, cobalt, iron, nickel, or copper; or the like can be used. These components can be used alone, or two or more of these may be used in combination. Among these, a zirconia-based material is desirably used, and zirconia stabilized with yttria, scandia, ytterbia, or the like is particularly desirably used.

Next, a green sheet for an electrolyte sheet is produced using the ceramic material powder thus prepared. In order to produce the green sheet for an electrolyte sheet, the tape forming method is preferably used, and in particular, the doctor blade method or the calendar method is preferably used. Specifically, first, a binder and a dispersion medium are added to the ceramic material powder and an additive or the like is optionally added thereto so as to prepare a slurry. This slurry is spread on a carrier film formed of a polymer film such as a polyethylene terephthalate (PET) film and formed into a sheet, and the slurry is dried to evaporate the dispersion medium. Thus, a green tape (green body) is obtained. This green tape is cut and/or punched into pieces of suitable size. Thus, a green sheet for an electrolyte sheet is produced. As the binder, dispersion medium, additive, etc. used to prepare the slurry, any known binder, dispersion medium, additive, etc. for use in producing electrolyte sheets for SOFCs can be used. Also as the polymer film used as the carrier film, any known polymer film for use in producing electrolyte sheets for SOFCs can be used.

(Pressing Step)

First, the green sheet thus obtained by cutting for use as an electrolyte sheet is removed from the carrier film. The green sheet thus removed from the carrier film is sandwiched between plates and a pressure is applied to the sheet in its thickness direction. The case where pressing polymer films are used as the plates is described as an example of the pressing step.

The pressing temperature may be room temperature, but it may be controlled to be heated at 100° C. or less. The pressure applied is desirably 10 to 40 MPa, and more desirably 15 to 30 MPa. When the pressure is less than 10 MPa, the effect of pressing is difficult to obtain and the stress in the peripheral portion of the green sheet is not sufficiently reduced. Thus, the effect of reducing the burr height is reduced. On the other hand, when the pressure applied exceeds 40 MPa, the green sheet itself may be deformed, causing a significant dimensional change after sintering.

Furthermore, it is desirable to adjust the pressure applied to the green sheet so that distribution of the pressure across the surface of the green sheet is such that pressures exerted on the surface fall within a range from 15% above to 15% below the average of the pressures. It is possible not only to reduce the burr height after sintering but also to reduce the waviness of the surface by adjusting the pressure applied so that the deviation of the distribution of the pressure applied is within plus or minus (±) 15% of the average of the pressures exerted. The pressure applied is adjusted so that the deviation of the distribution of the pressure is desirably within ±7.5%, more desirably within ±5% of the average of the pressures exerted. The pressure distribution on the green sheet can be determined using, for example, a film indicating pressed portions as red colored portions ("Prescale" manufactured by FUJIFILM Corporation) and a system capable of analyzing an image as a pressure distribution (Prescale pressure image analysis system "FPD-9270" manufactured by FUJIFILM Corporation).

The arithmetical mean roughness value (Ra) of the surfaces of the pressing polymer films facing the surfaces of the green sheet is desirably 0.001 µm or more and 0.1 µm or less. When the Ra exceeds 0.1 µm, it is difficult to remove the green sheet smoothly from the pressing polymer film. The Ra of the surface of the pressing polymer film facing the surface of the green sheet is more desirably 0.001 to 0.05 µm, even more desirably 0.001 to 0.02 µm, and particularly desirably 0.001 to 0.01 µm.

The dry peel force of the surface of the pressing polymer film facing the surface of the green sheet is desirably in a range of 10 to 1000 mN/cm. When the dry peel force is in the range of 10 to 1000 mN/cm, the green sheet can be removed smoothly from the pressing polymer film and thus the stress in the peripheral portion of the green sheet can be reduced. The dry peel force of the surface of the pressing polymer film facing the surface of the green sheet is more desirably 10 to 600 mN/cm, even more desirably 10 to 400 mN/cm, and particularly desirably 10 to 200 mN/cm.

As used herein, the dry peel force is a measure for evaluating the peel force of the pressing polymer film and is a value measured in the following manner. One surface of a double-faced adhesive tape ("No. 502" manufactured by Nitto Denko Corporation) is attached to the surface of a pressing polymer film sample to be measured and cut into a size of 50 mm×300 mm. The sample is left at room temperature for 1 hour and then the peel force thereof is measured. The peel force is measured as 180° peel force using a tensile tester ("Intesco Model 2001" manufactured by INTESCO Co., Ltd.) under the condition of a tensile speed of 300 mm/min.

Preferably, the pressing polymer film has an antistatic layer for static elimination. The presence of the antistatic layer prevents static electricity from being generated when the green sheet is removed from the pressing polymer film and thus prevents dust from adhering to the green sheet and the polymer film.

The surface resistivity of the pressing polymer film is desirably $10^{13}$ Ω/square or less, and more desirably $10^{10}$ Ω/square or less.

Desirably, the pressing polymer film has a release layer on its surface facing the surface of the green sheet. The release layer is not particularly limited as long as it contains a material having releasability. It is desirable to use a curable silicone resin, among such materials, because it has particularly high releasability. As the curable silicone resin, a type of resin containing curable silicone resin as a main component may be used, or a modified silicone type resin obtained by graft-polymerization or the like with an organic resin such as an urethane resin, an epoxy resin, or an alkyd resin. For the type of curable silicone resins, any type of curing reaction type resins such as addition, condensation, ultraviolet, electron beam and solvent-free type curable resins can be used. Specific examples of such curable silicone resins include: KS-772, KS-774, KS-775, KS-778, KS-779 H, KS-856, X-62-2422, and X-62-2461 manufactured by Shin-Etsu Chemical Co., Ltd.; DKQ3-202, DKQ3-203, DKQ3-204, DKQ3-205, DKQ3-210, and FSXK-2560 manufactured by Dow Corning Asia Corporation; YSR-3022, TPR-6700, TPR-6720, and TPR-6721 manufactured by Toshiba Silicone, Co., Ltd; and SD7220, SD7226, and SD7229 manufactured by Dow Corning Toray Co., Ltd. Furthermore, in order to control the releasability of the release layer, a release control agent may be used in combination. When a release layer is provided in the pressing polymer film, the coating amount of the material (Si) applied to form the release layer is desirably 0.01 to 5 $g/m^2$, more desirably 0.01 to 2 $g/m^2$, and even more desirably 0.01 to 1 $g/m^2$. When the coating amount is less than 0.01 $g/m^2$, it may be difficult to form a uniform coating layer due to unstable coating. On the other hand, when the coating amount exceeds 5 $g/m^2$, the coating adhesion and curability of the release layer itself may deteriorate.

The green sheet sandwiched between the pressing polymer films as described above is pressed in its thickness direction. Since the green sheet is obtained by cutting, into a predetermined shape, a green tape obtained by applying a slurry onto a carrier sheet and drying the slurry, tensile stress is generated in the green sheet, in particular, on the peripheral portion of the green sheet when it is removed from the carrier sheet. However, the tensile stress thus generated can be reduced by the above-described pressing step.

The material of the pressing polymer film is not particularly limited, and examples thereof include acrylic resins, polycarbonate resins, polyethylene resins, polyester resins, polyvinyl chloride resins, and vinylidene chloride resins. Among these, PET is preferred because the pressing polymer film is used repeatedly. Desirably, the thickness of the pressing polymer film is 0.05 to 2 mm.

The method of pressing the green sheet sandwiched between the pressing polymer films is not particularly limited, and the method using a single axis pressing machine, a twin axis pressing machine, a four axis pressing machine, a roll pressing machine, or the like can be employed.

When pressing, a stack of two pressing polymer films and one green sheet sandwiched therebetween may be pressed, or a stack of alternately arranged green sheets and pressing polymer films may be pressed.

In order to reduce the stress effectively, it is desirable that the tensile elongation at break of the green sheet to be pressed be 5% or more and 50% or less and the tensile yield strength thereof be 2.0 MPa or more and 20 MPa or less, as measured in a tensile test. It is further desirable that the tensile elongation at break be 8% or more and 30% or less and the tensile yield strength be 3.0 MPa or more and 15 MPa or less.

In the present embodiment, the example in which a polymer film is used as the pressing plate is described. Surface-smoothened sheets of paper, and surface-polished or Teflon (registered trademark)-coated metal plates made of materials such as tungsten carbide, stainless steel, die steel, stellite, special steel, and cemented carbide also can be used, as long as the Ra of the surface of the plate facing the surface of the green sheet is 0.001 μm or more and 0.1 μm or less and the dry peel force thereof is in the range of 10 to 1000 mN/cm.

(Sintering Step)

Next, the green sheet for an electrolyte sheet is sintered. The green sheet for an electrolyte sheet that has undergone the above-described pressing step is placed on a porous setter on a shelf board. For example, a stack of alternately arranged porous setters and green sheets for electrolyte sheets produced as described above, with porous setters being arranged as the top layer and the bottom layer of the stack, may be placed on the shelf board. The green sheets placed in this manner are sintered at a temperature of, for example, about 1200 to 1500° C., preferably 1250 to 1425° C., for about 1 to 5 hours. When the sintering temperature is higher than 1500° C., both the strength at ordinary temperatures (ordinary temperature strength) and the high temperature durability of the resulting electrolyte sheet may deteriorate presumably because rhombohedral crystals and monoclinic crystals are easily formed in the resulting sintered body. On the other hand, when the sintering temperature is lower than 1200° C., the sheet is not sufficiently sintered and it is difficult to obtain a dense sheet. Thus, not only the strength of the resulting electrolyte sheet is not sufficient but also gas may pass through the sheet. However, when the green sheet is sintered at temperatures in this range, not only the formation of rhombohedral crystals and monoclinic crystals is suppressed but also the relative density of the resulting sheet can be increased to 97% or more, preferably 99% or more. As a result, a sintered body sheet having excellent ordinary temperature strength and high temperature durability can be obtained. Here, the relative density refers to the value of the density determined by the Archimedes' method relative to the theoretical density (density determined by the Archimedes method/theoretical density). As the porous setter used to sinter the green sheet, a known porous setter used in the production of an electrolyte sheet for a SOFC can be used.

According to the method described above, an electrolyte sheet for a SOFC having the characteristics (1) and (2) described above can be obtained.

Second Embodiment

Figure 2:
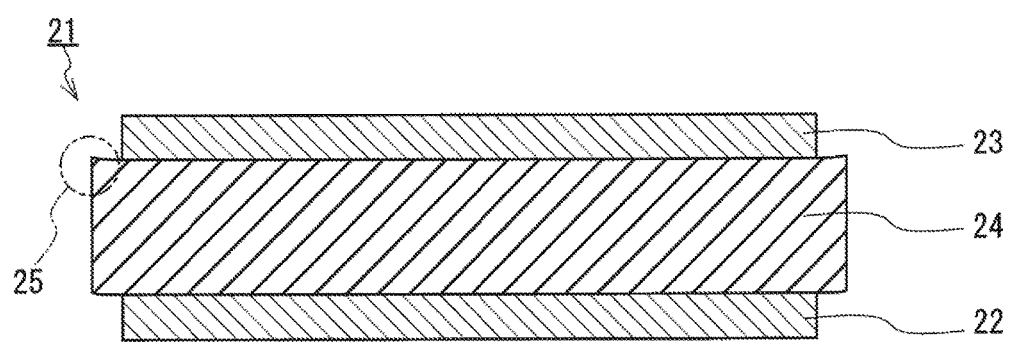
FIG. 2 is a cross-sectional view showing an embodiment of a SOFC single cell of the present invention.
Figure 3:
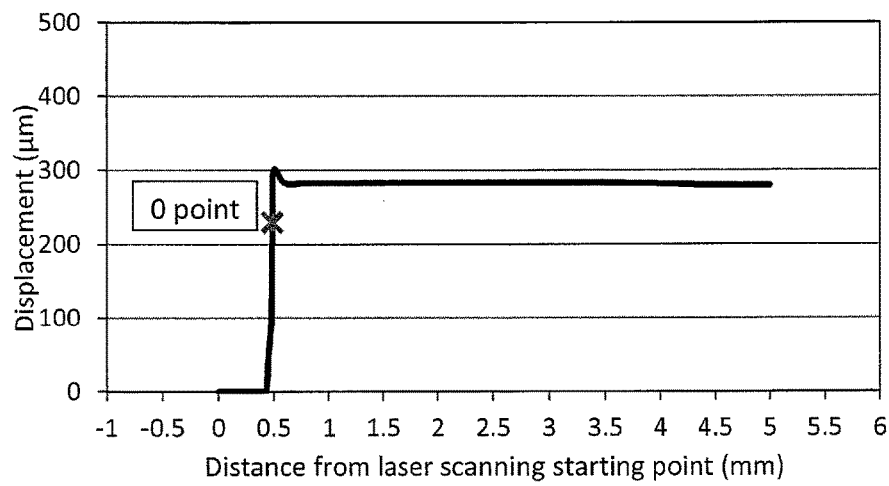
FIG. 3 is an example of a displacement curve obtained by laser-scanning the peripheral portion of a sheet of Example 1.

An embodiment of the SOFC single cell of the present invention is described specifically. FIG. 2 is a cross-sectional view showing an example of the structure of a SOFC single cell of the present embodiment.

A SOFC single cell 21 of the present embodiment includes an anode 22, a cathode 23, and an electrolyte sheet 24 for a SOFC disposed between the anode 22 and the cathode 23. As the electrolyte sheet 24, the electrolyte sheet for a SOFC described in the first embodiment is used. As the anode 22 and the cathode 23, an anode and a cathode used in a known SOFC can be used respectively.

The SOFC single cell 21 of the present embodiment can be produced by forming the anode 22 on one of the principal surfaces of an electrolyte sheet obtained by the method described in the first embodiment and forming the cathode 23 on the other principal surface thereof. First, a binder and a solvent are added to a material powder constituting the anode 22 or the cathode 23 and a dispersant or the like is optionally added thereto so as to prepare a slurry. This slurry is applied to one or the other principal surface of the electrolyte sheet 24 to form a coating layer with a predetermined thickness and the coating layer is dried. Thus, a green layer for the anode 22 or the cathode 23 is formed. The green layer is sintered to obtain the anode 22 or the cathode 23. The sintering conditions such as a sintering temperature may be determined as appropriate depending on the types of the materials used for the anode 22 and the cathode 23 respectively. As the materials constituting the anode 21 and the cathode 23, known materials used for anodes and cathodes for SOFCs can be used respectively. The types of the binders, solvents, etc. used to prepare the slurries for the anode 21 and the cathode 23 are not limited, and any binder, solvent, etc. can be appropriately selected from known ones used in the production methods for anodes and cathodes for SOFCs.

The SOFC single cell 21 of the present embodiment includes an electrolyte sheet which is less susceptible to defects such as cracking in its peripheral portion during production of SOFC single cells and stacking of the SOFC single cells, as described in the first embodiment. Therefore, according to the SOFC single cell 21, a highly reliable SOFC which is less susceptible to degradation of its power generation performance can be obtained.

EXAMPLES

Next, the present invention is described specifically by way of Examples. The present is not limited in any way by the following Examples.

Example 1

Green Sheet Producing Step

The following components were put into a nylon mill containing zirconia balls: 100 parts by mass of 10 mol % scandia-1 mol % ceria-stabilized zirconia powder (product name "10Sc1CeSZ", $d_{50}$:0.6 µm, manufactured by Daiichi Kigenso Kagaku Kogyo Co., Ltd.) as a ceramic material powder, 16 parts by mass of methacrylic copolymer-based binder (on the solid content basis) (number-average molecular weight: 100,000, glass transition temperature: −8° C.), 2 parts by mass of sorbitan trioleate as a dispersant, 3 parts by mass of dibutyl phthalate as a plasticizer, and 50 parts by mass of toluene/isopropanol mixed solvent (dispersion medium) (mass ratio=3/2) as a solvent. The resulting mixture was milled in the nylon mill for 40 hours. Thus, a slurry was prepared. The obtained slurry was transferred to a jacketed, cylindrical, round-bottom, vacuum degassing container having an internal volume of 50 L and equipped with an anchor-type stirrer. The slurry was condensed and degassed under a reduced pressure (approximately 4 to 21 kPa) at a jacket temperature of 40° C. while the stirrer was rotated at a rotation speed of 30 rpm, and thereby 25° C. viscosity of the slurry was adjusted to 3 Pa·s to obtain a coating slurry. The coating slurry was continuously applied onto a PET film by the doctor blade method. Next, the slurry was dried at 40° C., 80° C. and 110° C. sequentially to obtain a long 10Sc1CeSZ green tape (green body). This green tape was continuously cut into a piece with a diameter of about 160 mm using a set of four cutting dies to obtain a 10Sc1CeSZ green sheet (green sheet for an electrolyte sheet for a SOFC). Specifically, the green tape was fixed between an upper central die and a lower central die and then an upper peripheral rectangular die was brought down to cut the green tape. At the same time, a lower peripheral rectangular die moved down in conjunction with the movement of the upper peripheral rectangular die, and then these peripheral dies and the upper central die moved up. Thus, the green tape was cut with the peripheral dies into a green sheet with a diameter of about 160 mm.

<Pressing Step>

The green sheet thus obtained was sandwiched between commercially available PET films (plates). This PET film was a film having a release-treated surface on one side, and the dry peel force of the release-treated surface was 22 mN/cm, the surface roughness Ra thereof was 0.005 µm, and the surface resistivity thereof was $6 \times 10^7$ Ω/square. Specifically, an about 170 mm×170 mm square PET film was placed on a 200 mm×200 mm square smooth acrylic plate with a thickness of 10 mm, with the above-described release-treated PET surface facing upward. Next, the green sheet with a diameter of about 160 mm was transferred to and placed on the PET surface using a suction pad. Another PET film was prepared and placed on the green sheet, with the release-treated PET surface of the PET film facing downward, and then an acrylic plate like the above-mentioned acrylic plate was placed on the PET film. Thus, a stack of an acrylic plate, a PET film, a green sheet, a PET film, and an acrylic plate was formed. This stack was placed on a sample stage of a four axis press forming machine and pressed at a gauge pressure of 9.8 MPa for 1 second at ordinary temperature.

Another stack having the same structure as that of the above-mentioned stack was prepared. Medium pressure Prescale films ("Prescale MW" manufactured by FUJIFILM Corporation) were each sandwiched between a PET film and a green sheet in the stack prepared, and the resulting stack was pressed in the same manner. The pinpoint pressures exerted on arbitrarily selected 50 points in a measurement region of 0.5 mm² on the green sheet were measured, and the average of the pressures and the highest pressure were analyzed using a Prescale pressure image analysis system "FPD-9270" manufactured by FUJIFILM Corporation).

(Sintering Step)

Next, each of the green sheets that had undergone the pressing process was sandwiched between porous 99.5% alumina plates (porosity: 30%) with a maximum waviness height of 10 μm. Thus, a stack including 5 green sheets was obtained. The debindered green sheets were heated and sintered at 1420° C. for 3 hours. Thus, 10Sc1CeSZ electrolyte sheets with a diameter of 120 mm and a thickness of 280 μm were obtained. The thicknesses at arbitrarily selected 4 points in a region 5 mm or more inside the peripheral edge of each of the electrolyte sheets thus obtained (i.e., the central region of the sheet) were measured using a U-shaped micrometer (manufactured by Mitutoyo Corporation), and the average of the thicknesses was calculated and used as the thickness of the sheet.

Example 2

An electrolyte sheet was produced in the same manner as in Example 1, except that the pressing step was performed in a different manner. In the pressing step of Example 2, a PET film having release-treated surfaces on both sides was placed on a green sheet placed on a PET film, and then green sheets and PET films each having release-treated surfaces on both sides were alternately placed on one another. Thus, a stack including 5 green sheets was formed. This stack was placed on a sample stage of a four axis press forming machine and pressed at a gauge pressure of 9.8 MPa for 3 seconds at ordinary temperature. In Example 2, the dry peel force of the release-treated PET surface was 22 mN/cm, the surface roughness Ra thereof was 0.005 μm, and the surface resistivity thereof was $6\times10^7$ Ω/square, as in the case of Example 1. Two of the green sheets included in the stack that had undergone the pressing process, that is, the green sheet placed on the top of the stack and the green sheet placed on the bottom thereof were sintered. An electrolyte sheet obtained by sintering the top green sheet was used as a sheet of Example 2-1, and an electrolyte sheet obtained by sintering the bottom green sheet was used as a sheet of Example 2-2.

Example 3

An electrolyte sheet was produced in the same manner as in Example 1, except that different PET films were used under different pressing conditions in the pressing step. The PET films used in Example 3 were films each having a release-treated surface on one side, and the dry peel force of the release-treated surface was 40 mN/cm, the surface roughness Ra thereof was 0.005 μm, and the surface resistivity thereof was $6\times10^7$ Ω/square. The pressing step was performed under the pressing conditions of a gauge pressure of 21.1 MPa for 2 seconds at ordinary temperature.

Example 4

An electrolyte sheet was produced in the same manner as in Example 1, except that different PET films were used under different pressing conditions in the pressing step. The PET films used in Example 4 were films each having a release-treated surface on one side, and the dry peel force of the release-treated surface was 136 mN/cm, the surface roughness Ra thereof was 0.01 μm, and the surface resistivity thereof was $6\times10^7$ Ω/square. The pressing step was performed under the pressing conditions of a gauge pressure of 29.4 MPa for 2 seconds at ordinary temperature.

Example 5

An electrolyte sheet was produced in the same manner as in Example 1, except that different PET films were used under different pressing conditions in the pressing step. The PET films used in Example 5 were films each having a release-treated surface on one side, and the dry peel force of the release-treated surface was 380 mN/cm, the surface roughness Ra thereof was 0.03 μm, and the surface resistivity thereof was $6\times10^7$ Ω/square. The pressing step was performed under the pressing conditions of a gauge pressure of 32.4 MPa for 10 seconds at ordinary temperature.

Example 6

An electrolyte sheet was produced in the same manner as in Example 1, except that different materials were used and green sheets of different size were obtained in the green sheet producing step and different PET films were used under different pressing conditions in the pressing step. In Example 6, a 3YSZ green sheet was produced in the same manner as in Example 1, except that 3 mol % yttria-stabilized zirconia powder (product name "3YSZ" $d_{50}$: 0.4 μm, manufactured by Daiichi Kigenso Kagaku Kogyo Co., Ltd.) was used as a raw material powder and the target thickness of the green sheet was about 0.13 mm. The PET films used in Example 6 were films each having a release-treated surface on one side, and the dry peel force of the release-treated surface was 470 mN/cm, the surface roughness Ra thereof was 0.04 μm, and the surface resistivity thereof was $6\times10^7$ Ω/square. The pressing step was performed under the pressing conditions of a gauge pressure of 44.1 MPa for 30 seconds at ordinary temperature. The electrolyte sheet of Example 6 obtained after sintering was a 3YSZ electrolyte sheet with a diameter of 100 mm and a thickness of 0.1 mm.

Comparative Example 1

An electrolyte sheet was produced in the same manner as in Example 1, except that different PET films were used in the pressing step. The PET films used in Comparative Example 1 were films each having a release-treated surface on one side, and the dry peel force of the release-treated surface was 1080 mN/cm, the surface roughness Ra thereof was 0.13 μm, and the surface resistivity thereof was $6\times10^7$ Ω/square.

Comparative Example 2

An electrolyte sheet was produced in the same manner as in Example 1, except that different PET films were used under different pressing conditions in the pressing step. The PET films used in Comparative Example 2 were films each having a diameter of about 170 mm and a release-treated surface on one side, and the dry peel force of the release-treated surface was 4 mN/cm, the surface roughness Ra thereof was 0.0008 μm, and the surface resistivity thereof was $6\times10^7$ Ω/square. In producing a stack like the stack of Example 1 using these PET films, when a circular green sheet with a diameter of about 160 mm was placed on the PET film using a suction pad, the green sheet slipped on the PET film and the peripheral portion of the green sheet extended off the edge of the PET film. Therefore, the stack was formed with the side edge of the green sheet being held and fixed with tweezers, and then pressed at 61.8 MPa for 5 seconds at ordinary temperature.

Reference Example

A 10Sc1CeSZ green tape obtained in the same manner as in Example 1 was cut into a green sheet with a diameter of about 160 mm, with a pressing stroke of 40 mm and at a pressing speed of 80 spm using a continuous punching machine (product name "865B" manufactured by Sakamoto Zoki Co., Ltd.) equipped with a blade unit. The blade unit was an assembly of a single-edged new cutter blade with a diameter of about 160 mm and a blade angle θ of 57.5° in which 01 was 26.5° and $\theta_2$ was 31° (manufactured by Nakayama Shiki Zairyo Co., Ltd.) mounted on a plywood board and a hard green rubber member (product name "KSA-17" manufactured by Nakayama Shiki Zairyo Co., Ltd.) as a punch stripper. The green sheet thus obtained was subjected to the sintering step without being subjected to the pressing process using release-treated PET films. The sintering step was performed in the same manner as in Example 1.

For the electrolyte sheets of Examples 1 to 6, Comparative Examples 1 and 2, and Reference Example thus produced, the "measurement of burr heights", "load test of electrolyte sheets" "evaluation of cracking and chipping of electrolyte sheets after screen printing during production of single cells" and "simulated 5-cell stacking test" were performed.

(Measurement of Burr Heights)

For the electrolyte sheets of Examples 1 to 6, the electrolyte sheets of Comparative Examples 1 and 2, and the electrolyte sheet of Reference Example, the burr heights were measured in the following manner using the burr height measuring devices described in the embodiments (i.e., the high-accuracy double scanning laser sensor, LT series manufactured by Keyence Corporation and the high-speed three-dimensional shape measurement system "EMS2002AD-3D" manufactured by COMS Co., Ltd.). 4 regions located at the ends of the arms of an arbitrary cross in the peripheral portion of the sheet were scanned with a laser beam at a pitch of 0.01 mm. Specifically, the laser beam was applied from outside the sheet to the position about 5 mm inside the peripheral edge of the sheet toward the center thereof to obtain a displacement curve of the sheet surface in each region, and the burr heights were measured from the displacement curve.

Figure 4:
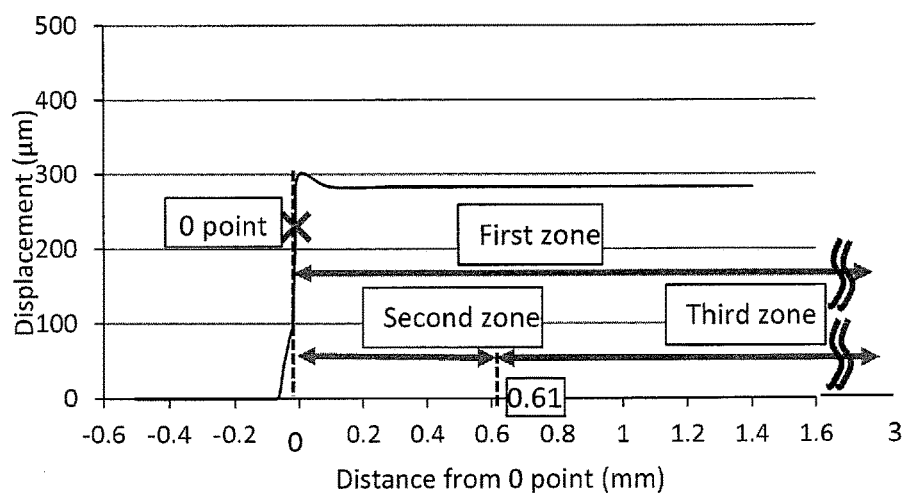
FIG. 4 shows an enlarged view of the displacement curve obtained by laser-scanning the peripheral portion of the sheet of Example 1.
Figure 5:
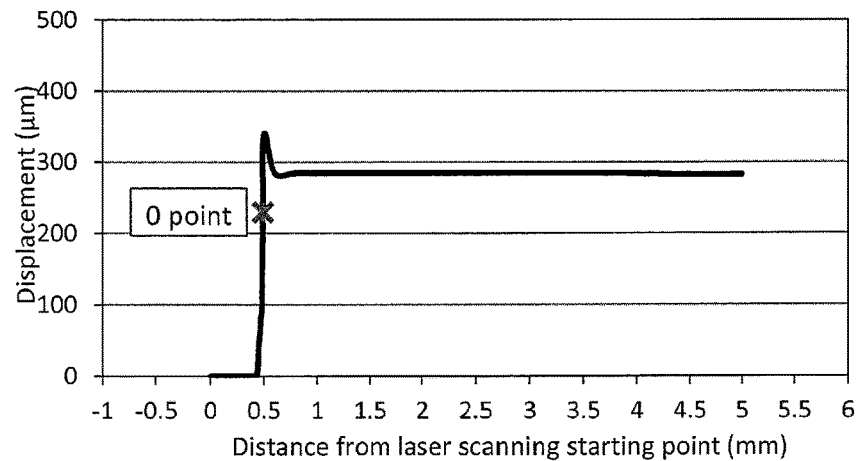
FIG. 5 is an example of a displacement curve obtained by laser-scanning the peripheral portion of a sheet of Example 4.
Figure 6:
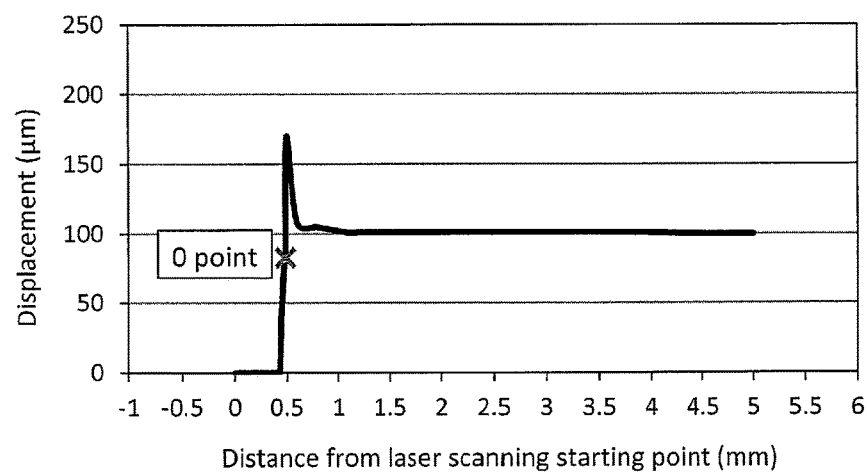
FIG. 6 is an example of a displacement curve obtained by laser-scanning the peripheral portion of a sheet of Example 6.

For the electrolyte sheets of Examples 1 to 6 and the electrolyte sheets of Comparative Examples 1 and 2, the burr heights in all the first to seventh zones were measured. The displacement curves of the peripheral portions of the sheets of Examples 1, 4, and 6 and Comparative Examples 1 and 2 are shown in FIG. 3, FIG. 5, FIG. 6, FIG. 7, and FIG. 8, respectively. Furthermore, the burr heights ΔH (0-0.7) and ΔH (0.71-3) were also measured to confirm that the maximum displacement point and the minimum displacement point that determine the burr height [ΔH (0-3)] in the first zone of the sheet surface are often present in a zone extending between the peripheral edge of the sheet and the position 0.6 mm inside the peripheral edge. FIG. 4 is an enlarged view of the displacement curve obtained in Example 1.

For the electrolyte sheet of Reference Example which was not subjected to the pressing process, the burr heights in the first to third, sixth, and seventh zones and the burr heights ΔH (0-0.08), ΔH (0.09-3), ΔH (0-0.05), and ΔH (0.06-3) were measured. For the electrolyte sheet of Reference Example, the same measurement was also performed at a pitch of 0.1 mm and a pitch of 0.001 mm.

The highest ΔH (0-3) value was selected, as the maximum burr height of the electrolyte sheet, from the measurement data of the 4 regions of the sheet, and the burr height measured in each zone of the selected region was used as the maximum burr height in that zone.

The burr heights ΔH (0-0.08), ΔH (0.09-3), ΔH (0-0.05), ΔH (0.06-3), ΔH (0-0.7), and ΔH (0.71-3) are defined as follows.

ΔH (0-0.08): Burr height in a zone extending between the peripheral edge of the sheet and a position 0.08 mm inside the peripheral edge ΔH (0.09-3): Burr height in a zone extending between a position 0.09 mm inside the peripheral edge of the sheet and the position 3 mm inside the peripheral edge ΔH (0-0.05): Burr height in a zone extending between the peripheral edge of the sheet and a position 0.05 mm inside the peripheral edge ΔH (0.06-3): Burr height in a zone extending between a position 0.06 mm inside the peripheral edge of the sheet and the position 3 mm inside the peripheral edge ΔH (0-0.7): Burr height in a zone extending between the peripheral edge of the sheet and a position 0.7 mm inside the peripheral edge ΔH (0.71-3): Burr height in a zone extending between a position 0.71 mm inside the peripheral edge of the sheet and the position 3 mm inside the peripheral edge Table 1 shows the burr height of the electrolyte sheet of Reference Example, and Table 2 shows the thicknesses and burr heights of the electrolyte sheets of Examples 1 to 6 and Comparative Examples 1 and 2.

(Load Test of Electrolyte Sheets)

An electrolyte sheet was sandwiched between two alumina plates (product name "SSA-S" manufactured by Nikkato K.K.) having flat and smooth surfaces parallel to each other so as to form a stack, the stack was placed on an alumina base plate, and the resulting stack was placed in an electric furnace. Then, a shelf board-shaped alumina weight was placed on the stack to apply a load of 0.8 kgf/cm$^2$ per unit area of the electrolyte sheet. In this state, the stack was heated from room temperature to 1000° C. over 10 hours, maintained at 1000° C. for 1 hour, and then cooled to room temperature. This operation was repeated and occurrence of cracking was observed by visual inspection and color check. Table 3 shows the results.

(Evaluation of Cracking and Chipping of Electrolyte Sheets after Screen Printing During Production of Single Cells)

For all the electrolyte sheets but the electrolyte sheet of Comparative Example 2, an anode was formed on one surface of each of the electrolyte sheets and a cathode was formed on the other surface thereof to form a SOFC single cell. Thus, 10 SOFC single cells for each Example (10 single cells for each of Examples, Comparative Example, and Reference Example) were prepared. Specifically, an anode paste composed of 60 parts by mass of nickel oxide powder ($d_{50}$: 0.9 μm) obtained by thermal degradation of basic nickel carbonate and 40 parts by mass of commercially available 8 mol % yttria-stabilized zirconia powder was applied to a central region with a diameter of about 110 mm of one surface of each electrolyte sheet excluding a 5 mm-wide peripheral region thereof by screen printing, and then dried. A cathode paste composed of 80 parts by mass of commercially available strontium-doped lanthanum manganate ($La_{0.6}Sr_{0.4}MnO_3$) powder and 20 parts by mass of commercially available 20 mol % gadolinia-doped ceria powder was applied to the other surface of the electrolyte sheet by screen printing in the same manner as for the anode paste, and then dried. The screen printing conditions were: a squeegee hardness of 70, a squeegee pressure of 0.38 MPa, a squeegee speed of 4.5 cm/s, and a squeegee angle of 70°. A 200-mesh Tetron screen was used. Then, cracking and chipping of the peripheral portion of each electrolyte sheet during screen printing were observed by visual inspection. Table 3 shows the results. Next, an crack-free and chip-free electrolyte sheet having electrodes printed on both surfaces thereof was sintered at 1300° C. for 3 hours. Thus, a single cell having a three-layer structure including a 40 μm-thick anode and a 30 μm-thick cathode formed therein.

(Simulated 5-Cell Stacking Test)

A 120 mm-diameter and 3 mm-thick lanthanum chromite separator (model "LCO" manufactured by Nikkato K.K.) with a groove as an air flow path was attached onto the cathode-side surface of the single cell produced for the "evaluation of cracking and chipping of electrolyte sheets after screen printing during production of single cells" to form a multilayer and the multilayer was sealed to obtain a separator-cell assembly. Thus, 5 assemblies for each Example (5 assemblies for each of Examples, Comparative Example, and Reference Example) were prepared. A nickel felt was attached to a nickel current collector embedded in a manifold, and on the nickel felt, 5 separator-cell assemblies with their anode-side surfaces facing upward were superposed, with nickel mesh sheets being interposed between the assemblies. A nickel felt was further attached onto the top separator-cell assembly, and a nickel current collector embedded in a manifold was placed on the top. Thus, a 5-cell stack was formed. This 5-cell stack was mounted in a power generation test apparatus for 120 mm-diameter 5-cell stacks.

In this state, the 5-cell stack was heated from room temperature to 950° C. over 10 hours while air was supplied to the cathode side and nitrogen was supplied to the anode side, maintained at 950° C. for 1 hour, and then cooled to room temperature. This operation was repeated, and the occurrence of gas leakage from the cathode side and the anode side was checked. Table 3 shows the results.

TABLE 1

| | | Test example | Reference Example | |
|---|---|---|---|---|
| Pressing step | | Not performed | | |
| Polymer film | | Not used | | |
| Measurement pitch (mm) | | 0.1 | 0.01 | 0.001 |
| Maximum burr height in each zone (μm) | ΔH (0-3) (first zone) | 27 | 37 | 39 |
| | ΔH (0-0.6) (second zone) | 26 | 37 | 39 |
| | ΔH (0.61-3) (third zone) | 11 | 16 | 17 |
| | ΔH (0-0.1) (sixth zone) | 26 | 37 | 39 |
| | ΔH (0.11-3) (seventh zone) | 12 | 16 | 16 |
| | ΔH (0-0.08) | — | 37 | 39 |
| | ΔH (0.09-3) | — | 15 | 14 |
| | ΔH (0-0.05) | — | 37 | 39 |
| | ΔH (0.06-3) | — | 13 | 14 |
| Ratio between maximum burr heights | ΔH (0.61-3)/ΔH (0-0.6) | 0.42 | 0.43 | 0.44 |
| | ΔH (0.11-3)/ΔH (0-0.1) | 0.46 | 0.43 | 0.41 |
| | ΔH (0.09-3)/ΔH (0-0.08) | — | 0.41 | 0.36 |
| | ΔH (0.06-3)/ΔH (0-0.05) | — | 0.35 | 0.36 |

TABLE 2

| | Test example | Ex. 1 | Ex. 2-1 | Ex. 2-2 | Ex. 3 | Ex. 4 | Ex. 5 | Ex. 6 | Com. Ex. 1 | Com. Ex. 2 |
|---|---|---|---|---|---|---|---|---|---|---|
| Pressing step | Dry peel force of polymer film (mN/cm) | 22 | 22 | | 40 | 136 | 380 | 470 | 1080 | 4 |
| | Pressure distribution (%) | ±6 | ±9 | ±7 | ±6 | ±5 | ±4 | ±3 | ±12 | ±17 |
| Thickness of electrolyte sheet (μm) | | 280 | 170 | 160 | 210 | 280 | 270 | 100 | 280 | 280 |
| Maximum burr height in each zone (μm) | ΔH (0-3) (first zone) | 17 | 23 | 21 | 41 | 55 | 78 | 69 | 113 | 179 |
| | ΔH (0-0.7) | 17 | 23 | 21 | 41 | 55 | 78 | 69 | — | — |
| | ΔH (0.71-3) | 13 | 15 | 14 | 26 | 29 | 47 | 51 | — | — |
| | ΔH (0-0.6) (second zone) | 17 | 23 | 21 | 41 | 55 | 78 | 69 | 113 | 179 |
| | ΔH (0.61-3) (third zone) | 13 | 15 | 14 | 26 | 29 | 47 | 51 | 44 | 76 |
| | ΔH (0-0.3) (fourth zone) | 17 | 23 | 21 | 41 | 55 | 78 | 65 | 113 | 179 |
| | ΔH (0.31-3) (fifth zone) | 14 | 18 | 16 | 34 | 37 | 69 | 59 | 44 | 76 |
| | ΔH (0-0.1) (sixth zone) | 17 | 23 | 21 | 41 | 55 | 75 | 62 | 113 | 179 |
| | ΔH (0.11-3) (seventh zone) | 14 | 21 | 20 | 40 | 43 | 70 | 58 | 44 | 126 |
| Ratio between maximum burr heights | ΔH (0.71-3)/ΔH (0-0.7) | 0.76 | 0.65 | 0.67 | 0.63 | 0.53 | 0.60 | 0.74 | — | — |
| | ΔH (0.61-3)/ΔH (0-0.6)* | 0.76 | 0.65 | 0.67 | 0.63 | 0.53 | 0.60 | 0.74 | 0.39 | 0.42 |
| | ΔH (0.31-3)/ΔH (0-0.3) | 0.82 | 0.78 | 0.76 | 0.83 | 0.67 | 0.88 | 0.91 | 0.39 | 0.42 |
| | ΔH (0.11-3)/ΔH (0-0.1) | 0.82 | 0.91 | 0.95 | 0.98 | 0.78 | 0.93 | 0.94 | 0.39 | 0.70 |

*the ratio of the burr height in the third zone to the burr height in the second zone, where the second zone is a zone extending between the peripheral edge of the sheet and a position 0.6 mm inside the peripheral edge, and the third zone is a zone extending between a position 0.61 mm inside the peripheral edge of the sheet and a position 3 mm inside the peripheral edge.

TABLE 3

| Electrolyte sheet used | Load test of electrolyte sheets | Cracking and chipping during screen printing (for 10 cells prepared) | Simulated stacking test |
|---|---|---|---|
| Example 1 | No cracking was observed after the test was repeated 10 times | None | No gas leakage |
| Example 2 | No cracking was observed after the test was repeated 10 times | None | No gas leakage |
| Example 3 | No cracking was observed after the test was repeated 10 times | None | No gas leakage |
| Example 4 | No cracking was observed after the test was repeated 10 times | None | No gas leakage |
| Example 5 | No cracking was observed after the test was repeated 10 times | None | No gas leakage |
| Example 6 | No cracking was observed after the test was repeated 10 times | None | No gas leakage |
| Com. Example 1 | Cracking was observed after the test was repeated 7 times | Cracking in 3 sheets and chipping in 5 sheets | Gas leakage was detected |
| Com. Example 2 | Cracking was observed after the test was performed once | Not performed | Not performed |
| Ref. Example | Cracking was observed after the test was repeated 9 times | Chipping in 2 sheets | No gas leakage |

Table 1 shows the burr heights of the electrolyte sheet of Reference Example obtained without being subjected to the pressing process using polymer films. These burr heights measured at a pitch of 0.1 mm are those measured at points in a region at least 0.1 mm inside the peripheral edge (0 point) of the sheet. Therefore, as shown in Table 1, the burr height (ΔH (0-0.05)) at a position 0.05 mm inside and the burr height (ΔH (0-0.08)) at a position 0.08 mm inside were not measured, although the burr height ΔH (0-3) in the measurement at a pitch of 0.1 mm was 27 μm.

When the burr heights of the electrolyte sheet of Reference Example were actually measured at a pitch of 0.01 mm, the burr height ΔH (0-3) was 37 μm, which was 10 μm higher than the burr height measured at a pitch of 0.1 mm. This means that the maximum burr height is present in the (0-0.05) zone. Thus, the measurement at a pitch of 0.01 mm apparently revealed the burr height that could not be detected in the measurement at a pitch of 0.1 mm.

The burr heights of the electrolyte sheet of Reference Example were more accurately measured at a pitch of 0.001 mm. This measurement apparently revealed the maximum burr height ΔH (0-0.05) of 39 μm, which was not detected in the measurement at a pitch of 0.01 mm.

As described above, the measurement of the burr heights at a smaller pitch, with more measurement points, and thus with more accuracy clearly showed the profile of the sheet with a warped-up edge. However, the measurement with a too small pitch caused a problem of an increase in the number of data to be processed, resulting in complicated data processing. The difference between the burr heights measured at a pitch of 0.01 mm and those measured at a pitch of 0.001 mm was not as significant as the difference between the burr height measured at a pitch of 0.1 mm and those measured at a pitch of 0.01 mm. Therefore, in the present invention, the measurement pitch was determined to be 0.01 mm. In Reference Example, when a cut piece of the green sheet was removed from the PET film using a suction pad, it was rather difficult to remove. Since the pressing process was not performed after the removal in Reference Example, the values of the ratios between the burr heights ΔH (0.61-3)/ΔH (0-0.6) and ΔH (0.11-3)/ΔH (0-0.1) were less than 0.5. This result shows that the degree of warping-up (ΔH (0-0.6) and ΔH (0-0.1)) near the peripheral portion of the sheet increased due to the stress exerted on the cut piece of the green sheet when it was removed from the PET film.

As shown in Table 2, the burr heights ΔH (0-3), ΔH (0-0.7), and ΔH (0-0.6) have the same values in all Examples 1 to 6. This fact shows that the peak of the maximum burr heights is not present in the zone (0.61-0.7 mm) but present in the second zone (0-0.6 mm), that is, the peak of the maximum burr heights is not present in the third zone (0.61-3 mm). This result confirms that the degree of warping-up near the peripheral edge of the sheet can be defined by selecting a zone extending between the peripheral edge of the sheet and the position 0.6 mm inside the peripheral edge (i.e., the second zone) as a zone in the peripheral portion of the sheet in which the maximum burr height is always observed and determining the ratio of the burr height in the third zone (0.61-3 mm) to the burr height in that second zone (0-0.6 mm).

Figure 7:
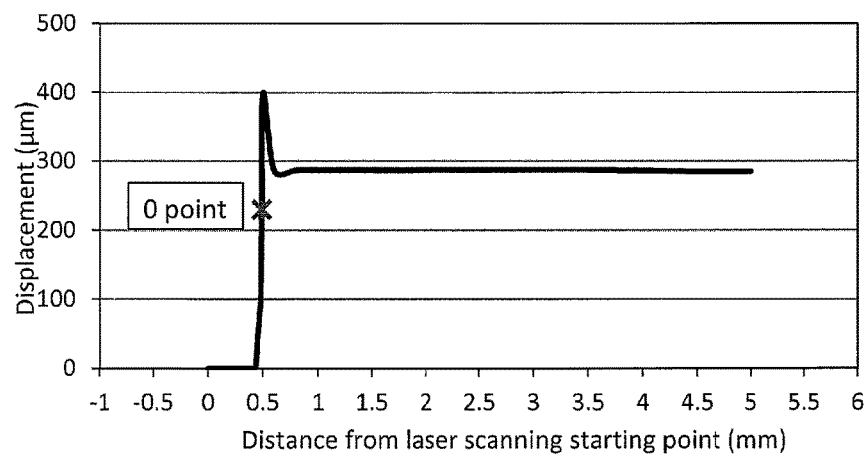
FIG. 7 is an example of a displacement curve obtained by laser-scanning the peripheral portion of a sheet of Comparative Example 1.

As shown in Table 2, in Comparative Example 1, since the dry peel force of the polymer film used in the pressing process was 1000 mN/cm or more, the pressed green sheet was not removed smoothly using a suction pad and thus the peripheral portion was significantly warped up also due to the stress exerted thereon when the sheet was removed, as shown in FIG. 7, resulting in the burr height ΔH (0-3) of more than 100 μm. In particular, the sheet was significantly warped up near the peripheral edge due to the stress exerted thereon when it was removed, and as a result, the ratios between the burr heights ΔH (0.61-3)/ΔH (0-0.6), ΔH (0.31-3)/ΔH (0-0.3), and ΔH (0.11-3)/ΔH (0-0.1) were less than 0.5.

Figure 8:
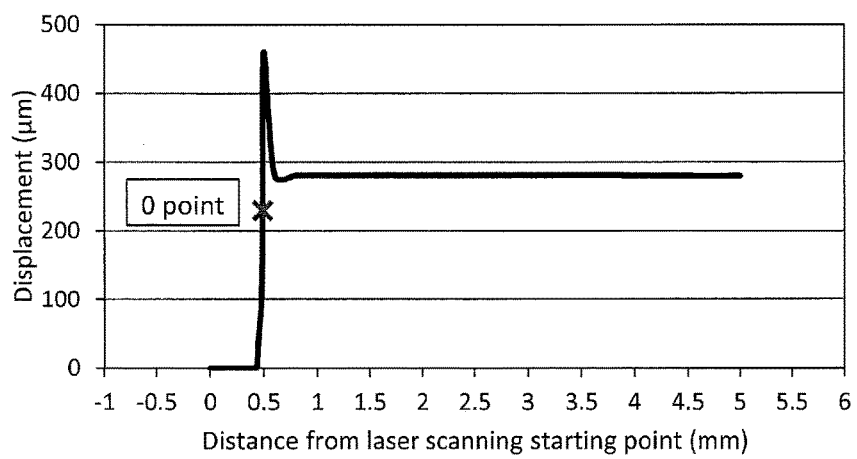
FIG. 8 is an example of a displacement curve obtained by laser-scanning the peripheral portion of a sheet of Comparative Example 2.
Figure 9:
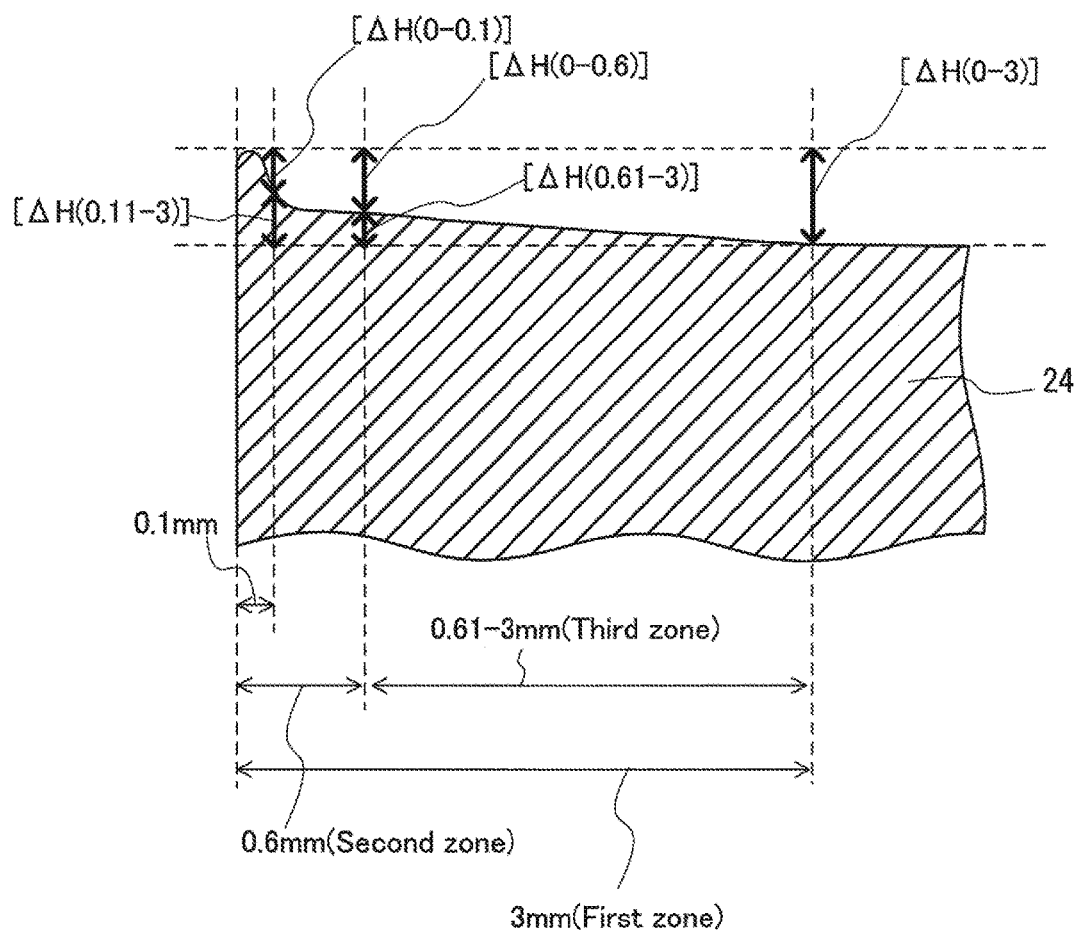
FIG. 9 is an enlarged view with annotations of the area 25 marked with a circle in FIG. 2.

Furthermore, in Comparative Example 2, since the dry peel force of the polymer film used in the pressing process was 10 mN/cm or less, the green sheet on the polymer film easily slipped on the film and the peripheral portion of the green sheet partially extended off the edge of the polymer film in the pressing step. As a result, it was impossible to apply a pressure over the entire surface of the sheet and thus the deviation of the pressure distribution was beyond the range of plus or minus (±) 15%. Therefore, the peripheral portion of the sintered electrolyte sheet showed a profile as shown in FIG. 8, and as shown in Table 2, the burr height ΔH (0-3) was more than 150 μm. Since stepped burrs were formed in the peripheral portion, the ratios between the maximum burr heights ΔH (0.61-3)/ΔH (0-0.6) and ΔH (0.31-3)/ΔH (0-0.3) were less than 0.5.

As shown in Table 3, no cracking occurred in the electrolyte sheets of Examples 1 to 6 even after the load test was repeated 10 times. Neither cracking nor chipping was observed in the electrolyte sheets of Examples 1 to 6 during the screen printing, and no gas leakage was also observed in these sheets in the simulated stacking test. Thus, since the electrolyte sheet having the characteristics defined in the present invention has a smaller burr height on the peripheral portion and has a lower degree of warping-up near the peripheral edge, this electrolyte sheet has high load strength. This shows that this electrolyte sheet is excellent as a highly reliable electrolyte sheet for a SOFC single cell.

On the other hand, all of the electrolyte sheets of Comparative Examples 1 and 2 and Reference Example suffered from cracking before the 10-time repetition of the load test was completed, and all of them suffered from cracking or chipping after the screen printing. Furthermore, gas leakage was also observed in the stimulated stacking test, which shows that cracking occurred in these electrolyte sheets during the stacking.

INDUSTRIAL APPLICABILITY

Since the electrolyte sheet for a SOFC of the present invention has reliable strength properties, it can contribute to improving the reliability of the resulting SOFC.

DESCRIPTION OF REFERENCE NUMERALS

11 Laser-based measuring instrument
12 Laser-based measuring instrument controller
13 Monitor
14 Electrolyte sheet sample
15 Automatic XY stage
16 Position controller
17 Personal computer for data processing
18 Analog controller
21 SOFC single cell
22 Anode
23 Cathode
24 Electrolyte sheet for SOFC

The invention claimed is:
1. An electrolyte sheet for a solid oxide fuel cell, the sheet having a thickness of 50 to 300 μm, wherein
in at least one of principal surfaces of the sheet,
(1) a burr height [ΔH (0-3)] in a first zone is 100 μm or less, as measured by irradiating the principal surface of the sheet with a laser beam at a pitch of 0.01 mm and three-dimensionally analyzing light reflected from the principal surface using a laser optical three-dimensional shape measurement device, the first zone being a zone extending between a peripheral edge of the sheet and a position 3 mm inside the peripheral edge, (2) a ratio [ΔH (0.61-3)/ΔH (0-0.6)] of a burr height [ΔH (0.61-3)] in a third zone to a burr height [ΔH (0-0.6)] in a second zone is 0.5 or more and 2.0 or less, as calculated from the burr heights measured by irradiating the principal surface of the sheet with a laser beam at a pitch of 0.01 mm and three-dimensionally analyzing light reflected from the principal surface using the laser optical three-dimensional shape measurement device, the second zone being a zone extending between the peripheral edge of the sheet and a position 0.6 mm inside the peripheral edge, and the third zone being a zone extending between a position 0.61 mm inside the peripheral edge of the sheet and the position 3 mm inside the peripheral edge, and (3) a ratio [ΔH (0.11-3)/ΔH (0-0.1)] of a burr height [ΔH (0.11-3)] in a zone extending between a position 0.11 mm inside the peripheral edge of the sheet and a position 3 mm inside the peripheral edge to a burr height [ΔH (0-0.1)] in a zone extending between the peripheral edge of the sheet and a position 0.1 mm inside the peripheral edge is 0.5 or more and 1.3 or less.

2. A method for producing an electrolyte sheet for a solid oxide fuel cell, comprising:

a green sheet producing step of preparing a slurry containing a ceramic material powder, a binder, and a dispersion medium, forming the slurry into a sheet and drying the sheet to obtain a green body, and cutting the green body into a predetermined shape to obtain a green sheet for an electrolyte sheet for a solid oxide fuel cell;

a pressing step of sandwiching the green sheet between plates whose surfaces facing surfaces of the green sheet each have an arithmetical mean roughness value (Ra) of 0.001 to 0.1 μm and a dry peel force of 10 to 1000 mN/cm and applying a pressure to the green sheet; and a sintering step of sintering the green sheet that has undergone the pressing step.

3. The method for producing an electrolyte sheet for a solid oxide fuel cell according to claim 2, wherein in the pressing step, the pressure applied to the green sheet is adjusted so that distribution of the pressure across the surface of the green sheet is such that pressures exerted on the surface fall within a range from 15% above to 15% below an average of the pressures.

4. A single cell for a solid oxide fuel cell, comprising:
an anode;
a cathode; and
the electrolyte sheet for a solid oxide fuel cell according to claim 1, disposed between the anode and the cathode.

* * * * *